(12) United States Patent  
Choe et al.

(10) Patent No.: US 9,031,421 B2  
(45) Date of Patent: May 12, 2015

(54) MEASURING DEVICE AND METHOD OF MEASURING SIGNAL TRANSMISSION TIME DIFFERENCE THEREOF

(71) Applicant: Electronics and Telecommunications Research Institute, Daejeon (KR)

(72) Inventors: Joong-Seon Choe, Daejeon (KR); Chun Ju Youn, Daejeon (KR); Jong-Hoi Kim, Daejeon (KR); Duk Jun Kim, Daejeon (KR); Yong-Hwan Kwon, Daejeon (KR); Kwang-Seong Choi, Daejeon (KR); Eun Soo Nam, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 14 days.

(21) Appl. No.: 13/934,589

(22) Filed: Jul. 3, 2013

(65) Prior Publication Data

US 2014/0205280 A1   Jul. 24, 2014

(30) Foreign Application Priority Data

Jan. 22, 2013   (KR) .................. 10-2013-0007084

(51) Int. Cl.  
 *H04B 10/06* (2006.01)  
 *H04B 10/077* (2013.01)

(52) U.S. Cl.  
 CPC .................................. *H04B 10/0779* (2013.01)

(58) Field of Classification Search  
 CPC ............. H04B 10/614; H04B 10/6165; H04B 10/6971; H04B 10/613; H04B 10/616; H04B 10/5057; H04B 10/60; H04B 10/6164; H04B 10/0775; H04B 10/0779; H04Q 2011/0083

USPC ......... 398/208, 141, 151, 161, 154, 155, 162, 398/158

See application file for complete search history.

(56) References Cited

U.S. PATENT DOCUMENTS

| 6,958,817 | B1  |    | 10/2005 | Zhu et al. |
|-----------|-----|----|---------|------------|
| 7,751,713 | B2  | *  | 7/2010  | Perkins et al. .................. 398/81 |
| 8,027,585 | B2  | *  | 9/2011  | Yokoyama ....................... 398/50 |
| 8,139,953 | B2  | *  | 3/2012  | Okayasu et al. ............... 398/183 |
| 8,406,621 | B2  | *  | 3/2013  | Painchaud et al. .............. 398/25 |
| 8,565,621 | B2  | *  | 10/2013 | Ibragimov et al. ............. 398/205 |
| 8,626,000 | B2  | *  | 1/2014  | Abe et al. ....................... 398/203 |
| 8,634,727 | B2  | *  | 1/2014  | Yasuda et al. .................. 398/208 |
| 8,670,678 | B2  | *  | 3/2014  | Sakamoto et al. ............. 398/208 |
| 8,687,974 | B2  | *  | 4/2014  | Zelensky et al. .............. 398/158 |
| 8,787,777 | B2  | *  | 7/2014  | Goldfarb ....................... 398/206 |
| 8,886,051 | B2  | *  | 11/2014 | Zelensky et al. .............. 398/158 |
| 8,909,068 | B2  | *  | 12/2014 | Stojanovic .................... 398/208 |

(Continued)

OTHER PUBLICATIONS

Andreas Umbach et al., "Integrated Limiting Balanced Photoreceiver for 43 Gbit/s DPSK Transmission", 31$^{st}$ European Conference on Optical Communication (ECOC), Sep. 25-29, 2005, pp. 497-498, vol. 3.

Tae Wei et al., "Optical fiber sensor based on a radio frequency Mach-Zehnder interferometer", Optics Letters, Feb. 15, 2012, pp. 647-649, vol. 37, No. 4.

*Primary Examiner* — Daniel Washburn  
*Assistant Examiner* — Hibret Woldekidan  
(74) *Attorney, Agent, or Firm* — Rabin & Berdo, P.C.

(57) ABSTRACT

Provided is a method of measuring signal transmission time difference of a measuring device. The measuring device according to embodiments, by measuring a skew on two optical paths through signal delays of sufficient sizes for skew measurement on the optical paths, even a skew having a minute size can be measured within a measurable range.

10 Claims, 7 Drawing Sheets

(56) References Cited

U.S. PATENT DOCUMENTS

| | | | | |
|---|---|---|---|---|
| 8,923,708 | B2* | 12/2014 | Tanimura | 398/209 |
| 8,929,731 | B2* | 1/2015 | Youn et al. | 398/25 |
| 2002/0027693 | A1* | 3/2002 | Watanabe | 359/173 |
| 2009/0324220 | A1* | 12/2009 | Perkins et al. | 398/48 |
| 2012/0213510 | A1* | 8/2012 | Stojanovic | 398/25 |
| 2012/0224847 | A1* | 9/2012 | Ibragimov et al. | 398/16 |
| 2013/0004158 | A1* | 1/2013 | Goldfarb | 398/25 |
| 2013/0266308 | A1* | 10/2013 | Fukuchi et al. | 398/16 |
| 2014/0140690 | A1* | 5/2014 | Abe et al. | 398/16 |

* cited by examiner

MEASURING DEVICE AND METHOD OF MEASURING SIGNAL TRANSMISSION TIME DIFFERENCE THEREOF

CROSS-REFERENCE TO RELATED APPLICATIONS

This U.S. non-provisional patent application claims priority under 35 U.S.C. §119 of Korean Patent Application No. 10-2013-0007084, filed on Jan. 22, 2013, the entire contents of which are hereby incorporated by reference.

BACKGROUND OF THE INVENTION

The present invention disclosed herein relates to an optical communication system, and more particularly, to a measuring device and a method of measuring signal transmission time difference thereof according to signal transmission between two optical signal paths.

As the optical communication technology advances, a new signal modulation scheme is applied to signal transmission. As an example of the modulation scheme, there is a quadrature phase shift keying (QPSK) scheme, a quadrature amplitude modulation (QAM) scheme, or a coherent optical orthogonal frequency division multiplexing (CO-OFDM) scheme. A receiver receiving a signal modulated in these modulation schemes uses a coherent optical receiver or a balanced optical receiver with a passive optical component such as an optical hybrid or an optical delay interferometer in order to extract phase information.

A time taken for two optical signals output from an optical hybrid (or optical delay interferometer) to arrive at an optical detecting device of a balanced optical receiver is determined according to paths of the two optical lines (or optical fibers). At this time, a time difference between the two paths is called a skew, and when a skew exists, a probability of an error occurrence increases in a received signal.

For a signal transmission in a phase modulation scheme, a skew may mainly occur between output optical lines of an optical hybrid of a receiving end, or input optical lines of a balanced optical receiver. It is very important to perform skew measurement on whether a skew corresponding to a data transmission speed necessary to a system can be provided.

To identically set signal transmission time in optical lines is important for a multimode ribbon optical fiber. Typically, the multimode ribbon optical fiber is used to transmit large amounts of data in a short distance. Accordingly, since a plurality of synchronized signals are transmitted in parallel, as the difference of passing times between signals becomes greater, a data transfer rate is further limited.

In order to measure a skew, measurement is made on what difference actually occurs in signal delay or what change in a phase is made between channels when a signal modulated in a sinusoidal form is transmitted and then received.

In order to directly measure a time difference in signal delay, a signal transmitted through each optical fiber channel is measured through an oscilloscope. At this time, a time difference between measured two signals is measured. However, it is intuitively expected that since a great part of two waveforms overlap when a skew is small, it is difficult to measure a time difference between them.

In addition, in order to measure a skew from a phase difference, a phase shift may be measured through comparison with a reference signal. At this time, a skew may be obtained according to a phase shift between two signals by measuring the phase shift. However, in order to measure a small skew, an optical signal modulated in a high frequency or a precise phase measuring device is required. In particular, since a skew needs to be smaller than 5 ps in 100 Gbps optical communications, it is difficult to measure the skew through a phase shift measurement.

SUMMARY OF THE INVENTION

The present invention provides a measuring device measuring a signal transmission time difference between optical signal paths through which the optical signals are transmitted, and a method of measuring a signal transmission time difference thereof.

Embodiments of the present invention provide measuring devices including: a light source generating an optical signal; an optical modulator modulating the optical signal; an optical splitter splitting the modulated signal into first and second optical signals; a first path into which a first optical line for transmitting the split first optical signal is inserted; a second path into which a second optical line for transmitting the split second signal is inserted; a balanced optical receiver receiving optical signals transmitted through the first and second paths; and an analyzer measuring a skew between the first optical line and the second optical line on the basis of a first signal combined through the first path into which the first optical line is inserted and the second path into which the second optical line is inserted, and a second signal combined through the first path into which the second optical line is inserted and the second path into which the first optical line is inserted.

In some embodiments, the analyzer may measure the skew by dividing a result of a sum or subtraction operation of the first and second signals in half.

In other embodiments, the analyzer may measure the skew by using an equation;

$\Delta T = |\Delta_{12}| = \frac{1}{2}(\Delta T' + \Delta T'')$ or $\frac{1}{2}|\Delta T' - \Delta T''|$ $\Delta T' = |T1 + T3 - T2 - T4|$, and $\Delta T'' = |T1 + T4 - T2 - T3|$, where, $\Delta_{12}$ is T1-T2, T1 denotes a time taken for transmission of an optical signal passing through the first optical line, T2 denotes a time taken for transmission of an optical signal passing through the second optical line, T3 denotes a time taken for transmission of an optical signal passing through the first path, and T4 denotes a time taken for transmission of an optical signal passing through the second path.

In still other embodiments, $\Delta T'$ and $\Delta T''$ are calculated as $$\Delta T' = \begin{cases} \Delta_{12} + \Delta_{34}, & \text{if } \Delta_{12} > -\Delta_{34} \\ -\Delta_{12} - \Delta_{34}, & \text{if } \Delta_{12} \leq -\Delta_{34} \end{cases}$$

and $$\Delta T'' = \begin{cases} \Delta_{12} - \Delta_{34}, & \text{if } \Delta_{12} > \Delta_{34} \\ -\Delta_{12} + \Delta_{34}, & \text{if } \Delta_{12} \leq \Delta_{34} \end{cases},$$

and $\Delta_{34}$ is T3-T4.

In even other embodiments, the measuring device may further include a delay element having a preset or adjustable time delay on one path of the first and second paths.

In yet other embodiments, at least one of the optical splitter and the balanced optical receiver may provide a preset or adjustable time delay on one path of the first and second paths.

In further embodiments, one path of the first and second paths may have a length to provide a preset skew value or greater.

In still further embodiments, the measuring device may further include a switch unit which controls the first optical line to be located on the first path, and the second optical line to be located on the second path at a first time, and controls the second optical line to be located on the first path, and the first optical line to be located on the second path.

In even further embodiments, the switch unit may include: a first switch connected to the optical splitter, and controlling positions of the first and second lines located on the first and second paths to be exchanged at the first and second times; and a second switch connected to the balanced optical receiver, and controlling positions of the first and second optical lines on the first and second paths to be exchanged at the first and second times.

In yet further embodiments, the analyzer may control an optical signal modulation operation through the optical modulator.

In other embodiments of the present invention, methods of measuring a signal transmission time difference in a measuring device, the method includes: when a first optical line is inserted into a first path, and a second optical line is inserted into a second path, receiving a first signal received through the first and second paths; when the second optical line is inserted into the first path and the first optical line is inserted into the second path, receiving a second signal received through the first and second paths; and measuring a skew between the first and second paths on the basis of the first and second signals.

In some embodiments, the measuring of the skew may be performed by dividing a result of sum or subtraction operation of the first and second signals in half.

In other embodiments, the first and second paths are positioned between an optical splitter and a balanced optical receiver.

In still other embodiments, the method may further include applying a delay time for providing a skew of a preset size to at least one of the first and second paths.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings. Like reference numerals refer to like elements throughout. It should be noted that in the description of the present invention, any description that may unnecessarily blur the point of the present invention is omitted.

The present invention provides a measuring device measuring a signal transmission time difference (for example, a skew) between optical signal paths through which optical signals are transmitted, and a method of measuring the signal transmission time difference thereof.

Figure 1:
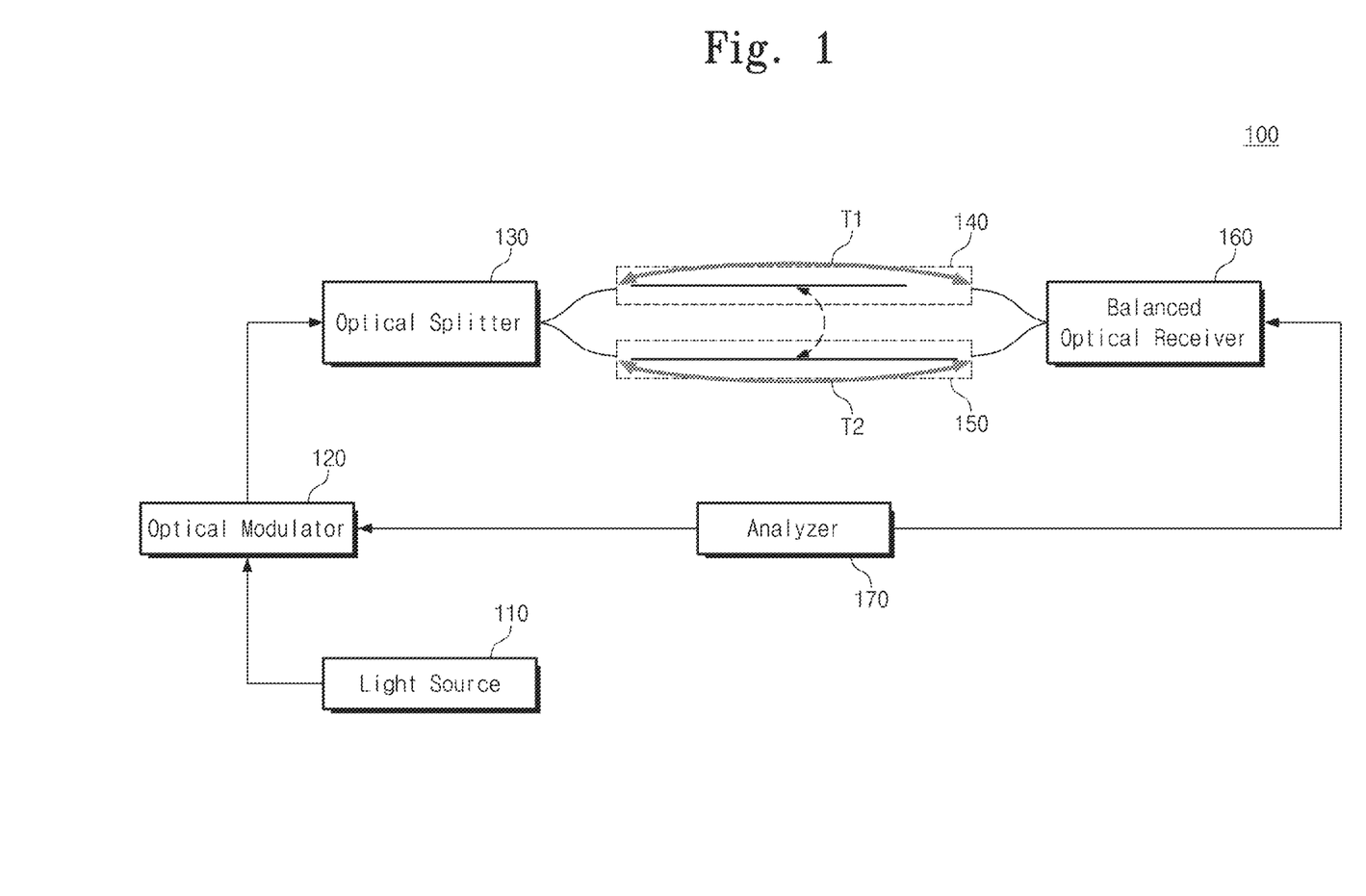
FIG. 1 illustrates a first measuring device measuring a signal transmission time difference of optical lines according to an embodiment of the present invention.

FIG. 1 illustrates a first measuring device for measuring a signal transmission time difference between optical lines according to an embodiment of the present invention.

Referring to FIG. 1, the first measuring device 100 includes a light source 110, an optical modulator 120, an optical splitter 130, a first path 140, a second path 150, a balanced optical receiver 160, and an analyzer 170. Here, the first measuring device 100 measures a skew between two paths 140 and 150. Also, in the first measuring device 100, there is no skew in the optical splitter 130 and the balanced optical receiver 160.

The light source 110 generates an optical signal. For example, the light source 110 includes a laser. The light source 110 outputs the generated optical signal to the optical modulator 120.

The optical modulator 120 modulates the optical signal in a preset modulation scheme. Here, the optical modulator 120 may modulate the optical signal under a control by the analyzer 170. The optical modulator 120 outputs the modulated optical signal to the optical splitter 130.

The optical splitter 130 splits the modulated optical signal to transmit to the two paths, namely, the first path 140 and the second path 150. Here, the optical splitter 130 has a 1×2 structure (one input and two outputs). The optical splitter 130 outputs the split optical signals to the first path 140 and the second path 150.

An optical line may be positioned on the first path. The first path 140 output the split optical signal to the balanced optical receiver 160 through the optical line. As an example, the first optical line OL1 positions on the first path 140.

An optical line may be positioned on the second path. The second path 150 outputs the split optical signal to the balanced optical receiver 160 through the optical line. As an example, the second optical line OL2 positions on the second path 140.

Here, the optical lines positioned on (or inserted into) the first and second paths 140 and 150 are formed of optical fibers.

The balanced optical receiver 160 outputs optical signals received through the first path 140 and the second path 150 to the analyzer 170.

The analyzer 170 measures a skew between the two paths 140 and 150 by using optical signals output from the balanced optical receiver 160.

An operation for measuring a skew performed in the analyzer is as follows. First, a skew is measured between the first and second paths 140 and 150 through optical signals received from the balanced optical receiver 160, when the first optical line OL1 is positioned on the first path 140, and the second optical line OL2 is positioned on the second path 150.

Here, there is no skew in the optical splitter 130 and optical receiver 160. At this time, an output from the balanced optical receiver 160, which is detected by the analyzer 170, may be expressed as the following equation 1.

$$\Delta t = \frac{RP_0}{2}(\sin(2\pi ft) - \sin(2\pi f(t + \Delta T))) \propto \quad (1)$$
$$\sin(2\pi ft)(1 - \cos(2\pi f \Delta T)) + \cos(2\pi ft)\sin(2\pi f \Delta T)$$

where, R denotes a reactivity of optical detection in a balanced optical receiver, $P_0$ denotes power of an optical signal, and f denotes a modulation frequency. In addition, $\Delta T(\equiv|T1-T2|)$ denotes a skew between the paths 140 and 150 through which the optical signals are transmitted.

A time average of an output spectrum measured by the analyzer 170 may be expressed as the following equation 2.

$$\langle P\text{out}\rangle \propto 1 - \cos(2\pi f \Delta T) \quad (2)$$

That is, since an output is cancelled at a frequency where $f\Delta T$ becomes an integer, a skew may measured between two paths 140 and 150, namely, the two optical lines OL1 and OL2 by obtaining a reciprocal of a free spectral range (hereinafter, referred to as FSR) which is a frequency difference between two adjacent minimum outputs in a spectrum measured by the analyzer 170.

However, there may be skews in an output part of the optical splitter 130 and an input part of the balanced optical receiver 160. Like this, measuring a skew between the optical lines will be described referring to FIGS. 2 to 5, when the output part of the optical splitter 130 and the input part of the balanced optical receiver 160 have skews.

Figure 2:
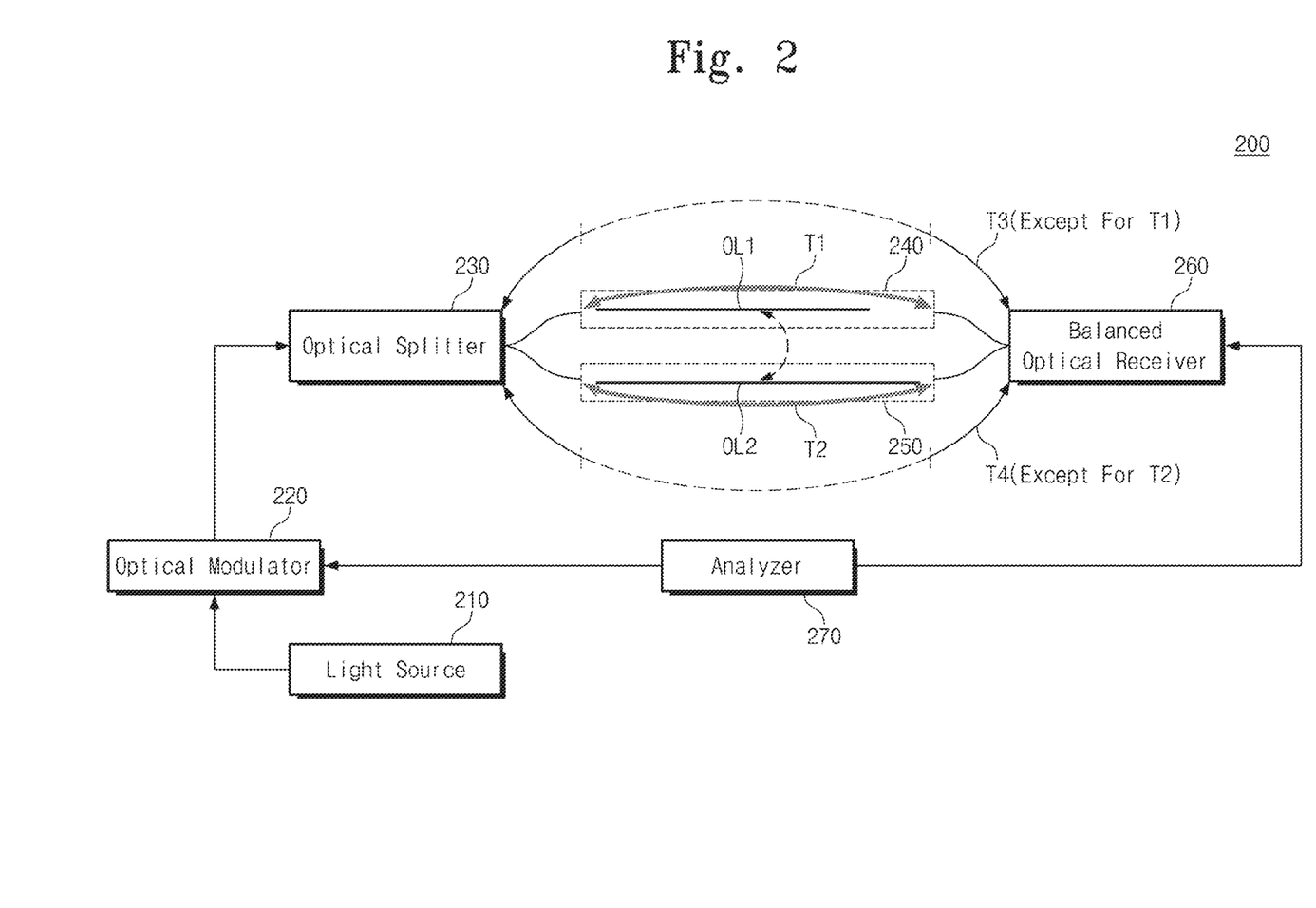
FIG. 2 is illustrates a second measuring device measuring a signal transmission time difference of optical lines according to another embodiment of the present invention.

FIG. 2 illustrates a second measuring device measuring a signal transmission time difference between optical lines according to another embodiment of the present invention.

Referring to FIG. 2, the second measuring device 200 includes a light source 210, an optical modulator 220, an optical splitter 230, a first path 240, a second path 250, a balanced optical receiver 260, and an analyzer 270. Here, the second measuring device 200 measures a skew between two paths 240 and 250. Also, in the second measuring device 200, there is a skew in at least one of the optical splitter 230 and the balanced optical receiver 260.

The second measuring device 200 has a similar structure to the first measuring device 100, except for having skews in an output part of the optical splitter 230 and an input part of the balanced optical receiver 260. Therefore, detailed description regarding the second measuring device 200 may refer to the detailed description regarding the first measuring device 100.

Here, there are skews in the output part of the optical splitter 230 and the input part of the balanced optical receiver 260. A time taken to transmit an optical signal through the first path 240 between the optical splitter 230 and the balanced optical receiver 260 is T3, and a time taken to transmit an optical signal through the second path 250 between the optical splitter 230 and the balanced optical receiver 260 is T4.

And T3 and T4 do not respectively include times taken for signal transmission in the first path 240 and the second path 250, namely, T1 and T2. That is, T3 and T4 are the times taken for signal transmission in a period except the first path 240 or the second path 250 between an input part of the optical splitter 230 and an output part of the balanced optical receiver 260. Therefore, T3 and T4 to be described below do not respectively include times T1 and T2 taken for signal transmission through the first path 240 or the second path 250. Here, T3 and T4 are not the same. Meanwhile, since the first measuring device 100 has a structure without a skew, T3 and T4 are the same in the first measuring device 100.

In addition, a time taken for transmission of a signal passing through the first optical line OL1 is T1, and a time taken for transmission of a signal passing through the second optical line OL2 is T2. Actually, a skew desired to be measured by the analyzer 270 is T1-T2.

The analyzer 270 receives optical signals having passed through the first path 240 including the first optical line OL1, and the second path 250 including the second optical line OL2. At this time, a skew $\Delta T'$ measure by the analyzer 270 may be expressed as the following equation 3.

$$\Delta T' = |T1 + T3 - T2 - T4| \quad (3)$$

Here, a skew $\Delta T'$ may be measured by using equation 2. However, a skew desired to be measured is $\Delta T$. When the T3 and T4, or T3-T4 is not exactly known, it is difficult to measure $\Delta T$ by using equation 3. Here, a time taken for transmission of an optical signal passing through the first path 240 is T1+T3, and a time taken for transmission of an optical signal passing through the second path 250 is T2+T4.

For this, the analyzer 270 receives optical signals having passed through the first path 240 including the second optical line OL2, and the second path 250 including the first optical line OL1. At this time, a skew $\Delta T''$ measured by the analyzer 270 may be expressed as the following equation 4.

$$\Delta T'' = |T1 + T4 - T2 - T3| \quad (4)$$

At this time, since optical lines located on the paths are exchanged, a time taken for transmission of an optical signal passing through the first path 240 is T1+T4, and a time taken for transmission of an optical signal passing through the second path 250 is T2+T3.

The analyzer 270 measures a skew $\Delta T$ by using equations 3 and 4. In order to measure a skew by using the analyzer 270, Ti−Tj is defined as $\Delta ij$.

At this time, equation 3 may be expressed as the following equation 5.

$$\Delta T' = \begin{cases} \Delta_{12} + \Delta_{34}, & \text{if } \Delta_{12} > -\Delta_{34} \\ -\Delta_{12} - \Delta_{34}, & \text{if } \Delta_{12} \leq -\Delta_{34} \end{cases} \quad (5)$$

Also, equation 4 may be expressed as the following equation 6.

$$\Delta T'' = \begin{cases} \Delta_{12} - \Delta_{34}, & \text{if } \Delta_{12} > \Delta_{34} \\ -\Delta_{12} + \Delta_{34}, & \text{if } \Delta_{12} \leq \Delta_{34} \end{cases} \quad (6)$$

By using equations 5 and 6, a skew $\Delta T$ may be expressed as the following equation 7 according to sizes of $\Delta_{12}$ and $\Delta_{34}$.

$$\Delta T = |\Delta_{12}| = \tfrac{1}{2}(\Delta T' + \Delta T'') \text{ or } \tfrac{1}{2}|\Delta T' - \Delta T''| \quad (7)$$

A skew on an optical path may be determined as one of two in equation 7 according to sizes of $\Delta_{12}$ and $\Delta_{34}$.

As described above, when there are skews in the optical splitter 230 and the balanced optical receiver 260, the entire skews are made to be included within a measurable range even though a skew ΔT on an optical path is small. Thus, when the skew has a smaller value than typical skews, the skews in the optical splitter 230 and the balanced optical receiver 260 may be used. The analyzer 270 can measure skews on the paths by adding an auxiliary skew between the optical splitter 230 and the balanced optical receiver 260 without using wide bandwidth equipment for measuring a skew.

Figure 3:
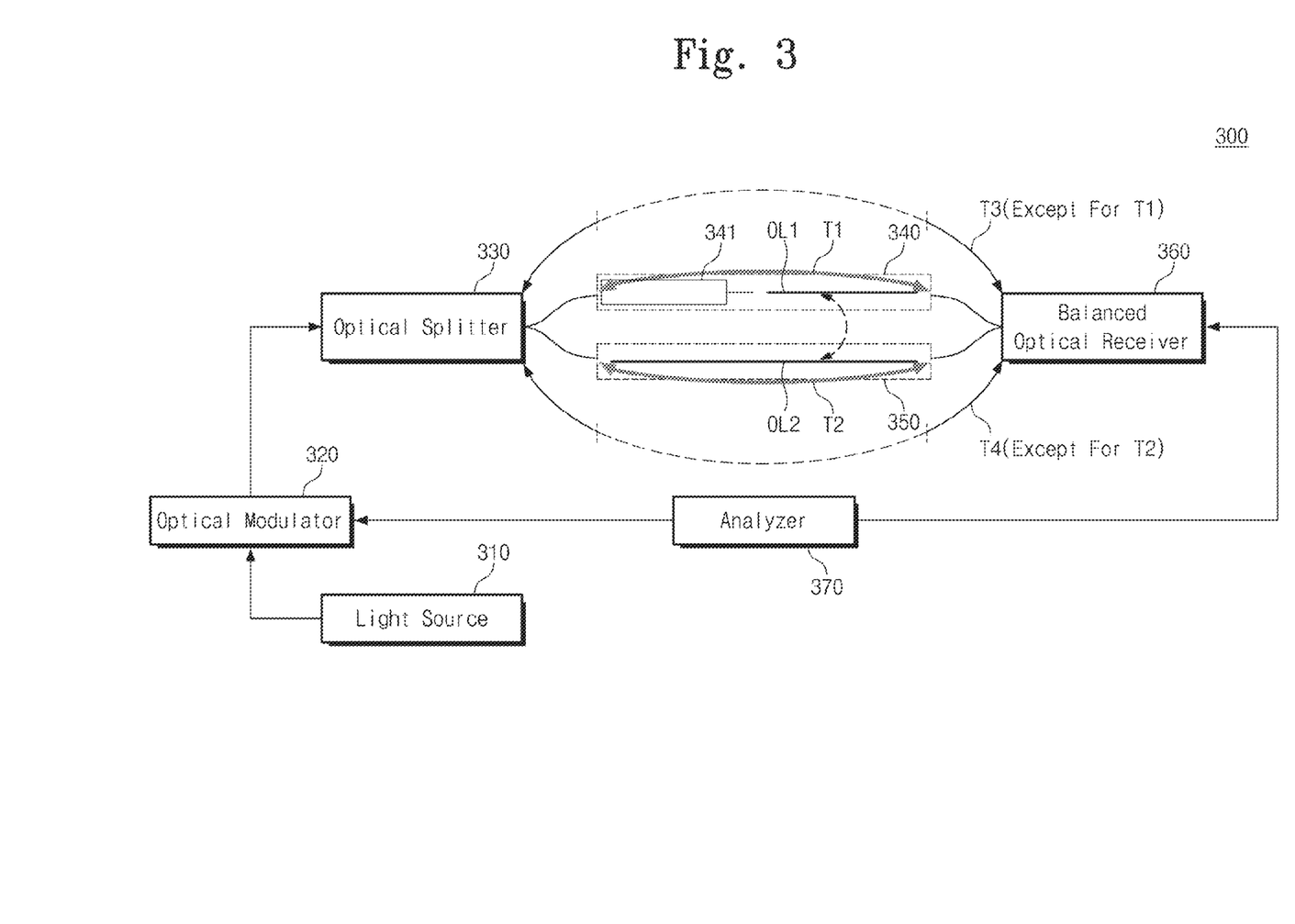
FIG. 3 illustrates a third measuring device measuring a signal transmission time difference of optical lines according to another embodiment of the present invention.

FIG. 3 illustrates a third measuring device measuring a signal transmission time difference of optical lines according to another embodiment of the present invention.

Referring FIG. 3, the third measuring device includes a light source 310, an optical modulation 320, an optical splitter 330, a first path 340, a second path 350, a balanced optical receiver 360, and an analyzer 370. Here, the third measuring device 300 measures a skew between two paths 340 and 350. Also, the third measuring device 300 includes an optical path element for applying a skew of a predetermined size to one of the two paths. For example, the third measuring device 300 includes an optical path element 341 on the first path 340. Alternatively, the third measuring device 300 may include an optical path element 341 on the second path 350.

Accordingly, the third measuring device 300 has a similar structure to the first measuring device 100, except for having an optical path element 341 on the first path 340. Therefore, the detailed description regarding the third measuring device 300 may refer to the description regarding the first measuring device 100.

The optical path element 341 is an element providing a time delay of a predetermined size such as an optical delay line, namely, a skew. For example, a skew change may be confirmed by changing the length of the optical path element. Namely, a skew $\Delta_{34}$ increases along with an increase of the length of the optical path element 341. At this time, the analyzer 370 may measure skews ΔT' and ΔT" by using equations 5 and 6.

As the skew $\Delta_{34}$ increases along with the increase of the length of the optical path element 341, an FSR may increase. At this time, the analyzer 370 measures a skew ΔT' by using $-\Delta_{12}-\Delta_{34}$ in equation 5. Also, the analyzer 370 measures a skew ΔT" by using $\Delta_{12}-\Delta_{34}$ in equation 6. When there is no size information between $\Delta_{12}$ and $\Delta_{34}$, the analyzer 370 may obtain a skew by using an additional optical component, namely, an optical path element.

Figure 4:
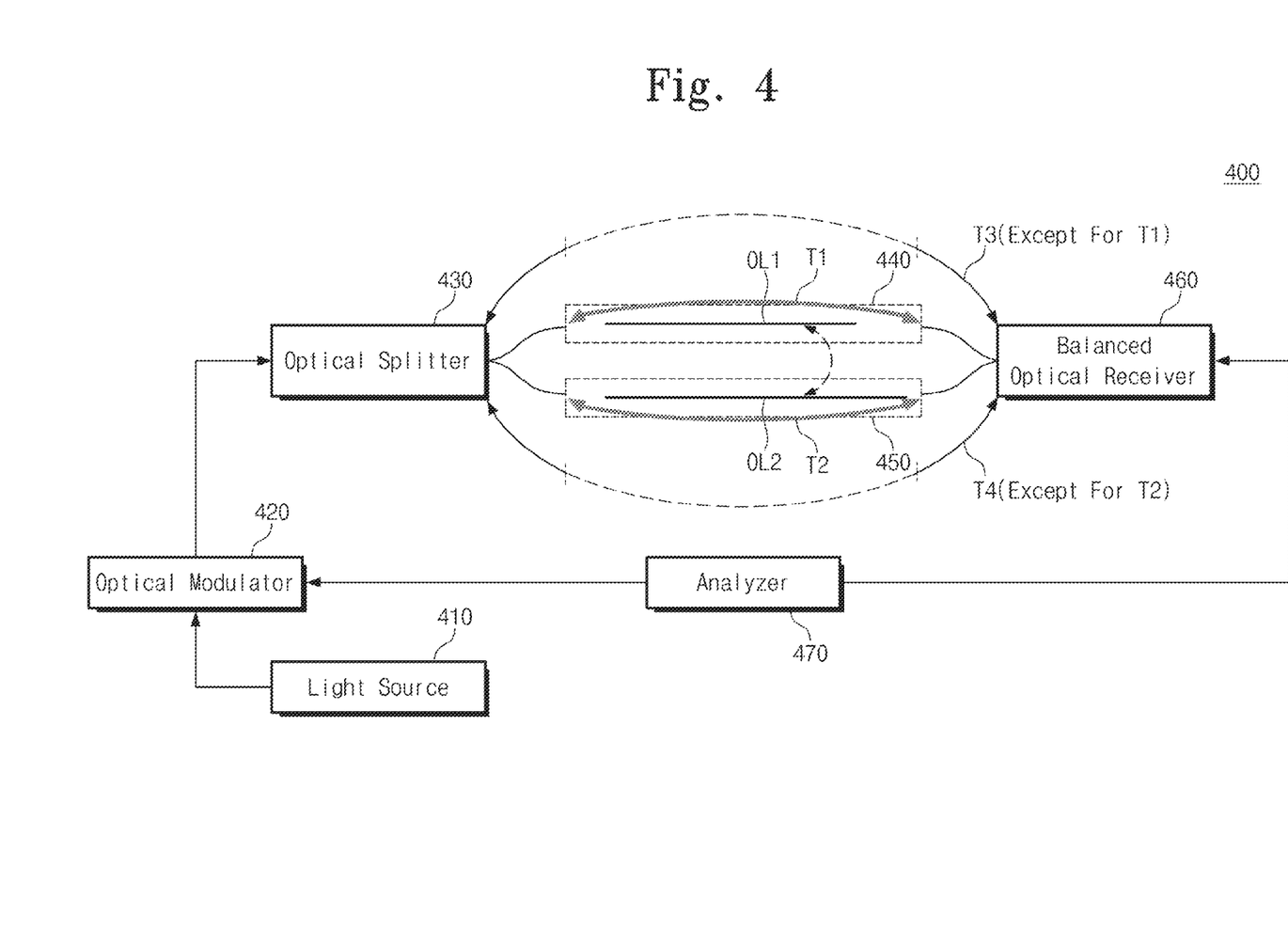
FIG. 4 illustrates a fourth measuring device measuring a signal transmission time difference of optical lines according to another embodiment of the present invention.

Referring to FIG. 4, the fourth measuring device 400 includes a light source 410, an optical modulation 420, an optical splitter 430, a first path 440, a second path 450, a balanced optical receiver 460, and an analyzer 470. Here, the fourth measuring device 400 measures a skew between two paths 440 and 450. Also, the optical splitter 430 applies a predetermined skew to one of the two paths. Here, the optical splitter 430 applies the predetermined skew in order that $\Delta_{34}$ has a relative larger value compared to $\Delta_{12}$.

For example, the fourth measuring device 400 applies a predetermined skew to at least one of two paths in the optical splitter 430.

Accordingly, the fourth measuring device 400 has a similar structure to the first measuring device 100 except for applying a skew in the optical splitter 430. Therefore, the detailed description regarding the fourth measuring device 400 refers to the detailed description regarding the first measuring device 400.

The analyzer 470 of the fourth measuring device 400 measures skews ΔT' and ΔT" along optical lines T1 and T2 located on paths as the analyzer 370 in the third measuring device 300. Also, a skew ΔT on an actual path, namely, between the optical lines may be measured by using the measured skews ΔT' and ΔT".

It is exemplified that, in the fourth measuring device 400, the optical splitter 430 has a larger skew compared to each optical line OL1 or OL2. However, the balanced optical receiver 460 may have a large skew in order for the skew ΔT to be included within a measurable range. Also, both the optical splitter 430 and the balanced optical receiver 460 have large skews in order for the skew ΔT to be included within a measurable range.

Figure 5:
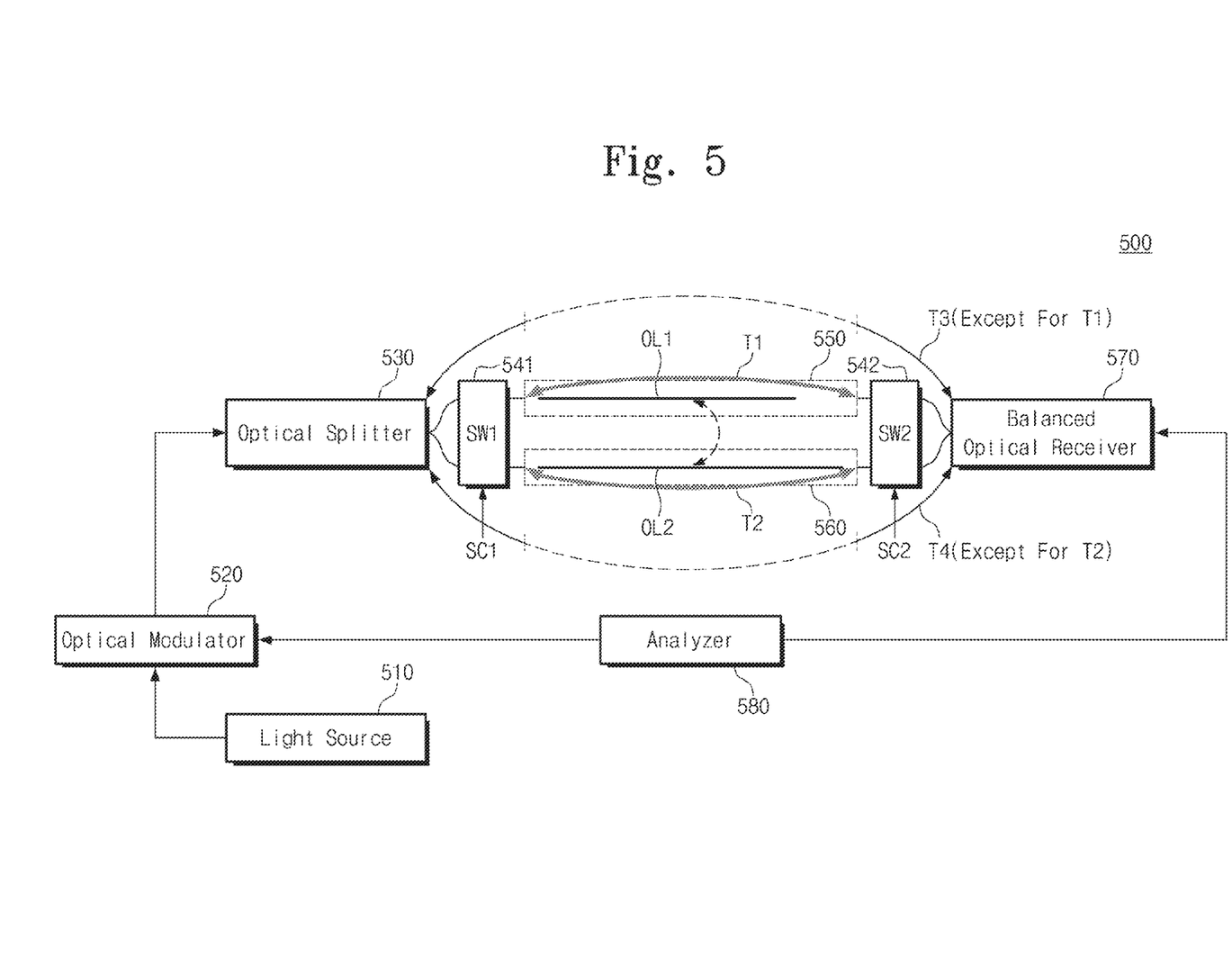
FIG. 5 illustrates a fifth measuring device measuring a signal transmission time difference of optical lines according to another embodiment of the present invention.

FIG. 5 illustrates a fifth measuring device measuring a signal transmission time difference of optical lines according to another embodiment of the present invention.

Referring to FIG. 5, the fifth measuring device 500 includes a light source 510, an optical modulation 520, a first switch 531, an optical splitter 540, a first path 550, a second path 560, a balanced optical receiver 570, a second switch 542, and an analyzer 580. Here, the fifth measuring device 500 measures a skew between two paths 550 and 560.

The fifth measuring device 500 further includes a switch unit including the first switch 541 and the second switch 542. The fifth measuring device 500 has s similar structure to the first measuring device 100 except for a structure including the switch unit. Therefore, description on a detailed structure of the fifth measuring device 500 refers to the description regarding the first measuring device 100.

Here, the first switch 541 switches an output signal from the optical splitter 530 from a first optical line OL1 to a second optical line OL2 in response to a first switch control signal SC1. The second switch 542 outputs signals from the first and second optical lines OL1 and OL2 to the balanced optical receiver 570 in response to a second switch control signal SC2.

Here, the switch control signals SC1 and SC2 control the switches 541 and 542 in order for the first optical line OL1 to be located on the first path 550, and the second optical line OL2 to be located on the second path 560, at a first time. Also, the switch control signals SC1 and SC2 control the switches 541 and 542 in order for the first optical lines OL1 to be located on the second path 560, and the second optical lines OL2 to be located on the first path 550, at a second time.

As described above, a skew may be measured by switching positions of optical lines located on paths through switches.

Figure 6:
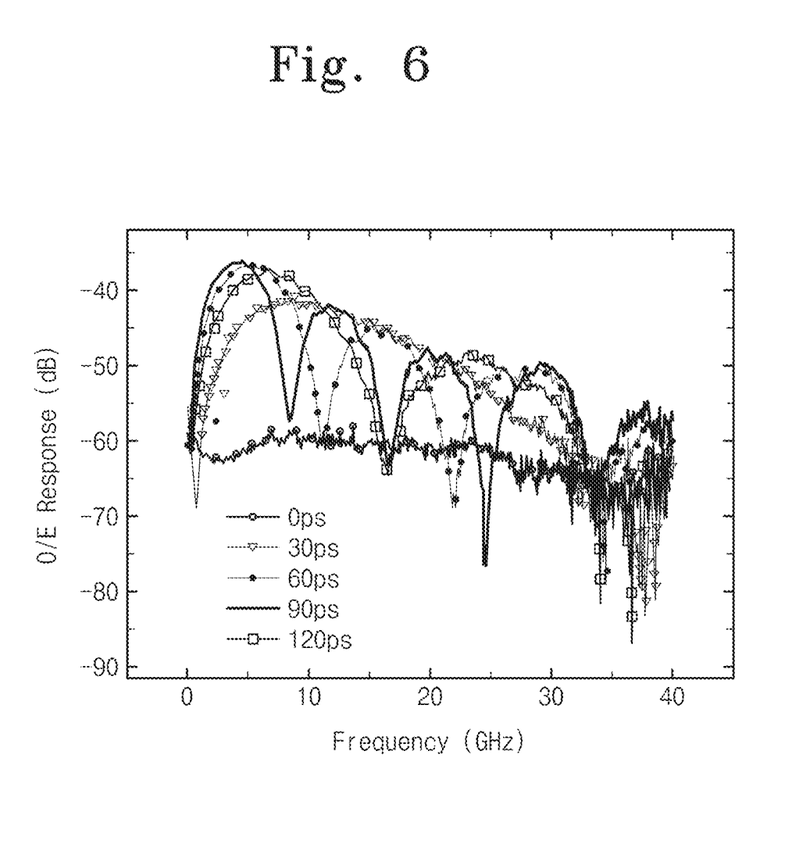
FIG. 6 is a graph illustrating a spectrum according to a skew existing on paths according to an embodiment of the present invention.

FIG. 6 is a graph illustrating a spectrum according to a skew existing on paths according to an embodiment of the present invention.

Referring to FIG. 6, a horizontal axis of the graph denotes a frequency (GHz), and a vertical axis denotes a photoelectric response (dB). Namely, the vertical axis represents a response to signals received through the balanced optical receiver.

A spectrum at 0 ps represents that there is no skew. When a skew between the optical lines is minute, it is not easy to measure the skew.

Spectrums at 30 ps, 60 ps, 90 ps, and 120 ps represent that there are artificial skews between paths on which optical lines are located on paths, an optical splitter, or a balanced optical receiver. From this, it may be confirmed that a skew is measured by a reciprocal of an FSR, which is a frequency difference between two minimum outputs, through a spectrum.

Figure 7:
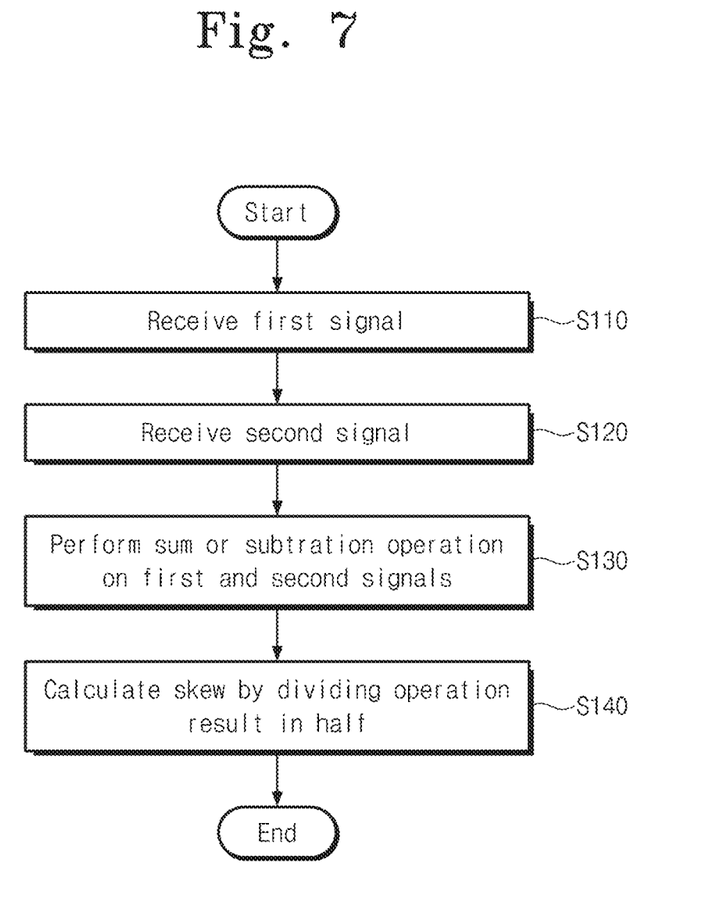
FIG. 7 is a flow chart illustrating an operation of measuring a signal transmission time difference according to an embodiment of the present invention.

FIG. 7 is a flow chart illustrating an operation of measuring a signal transmission time difference according to an embodiment of the present invention.

Referring to FIG. 7, an analyzer in a measuring device receives first signals at a first time (operation S110). At this time, a first optical line OL1 locates on a first path and a second optical line OL2 locates on a second path, in the measuring device.

The analyzer receives a second signals at a second time (operation S120). At this time, the second optical line OL2 locates on the first path and the first optical line OL1 locates on the second path, in the measuring device. Here, the first time is different from the second time.

As described above, optical signals are received by changing locations of the optical lines OL1 and OL2 on the two paths. From this, a skew $\Delta_{12}$ only for optical lines may be measured from an additional skew $\Delta_{34}$ existing on one of the first and second paths, except for the skew $\Delta_{12}$ only for optical lines. At this time, $\Delta_{34}$ has a relative larger value compared to $\Delta_{12}$.

That is, the first optical line OL1 needs a time T1 taken for signal transmission, and the second optical line OL2 needs a time T2 for signal transmission.

The analyzer performs a sum or subtraction operation on the first and second signals (operation 130). At this time, the analyzer performs a sum or subtraction operation on the first and second signals according to equations 5 and 6.

The analyzer calculates a skew by dividing a result of the sum or subtraction operation in half (operation 140). Here, the calculations of the skew $\Delta T$ in operations S130 and S140 are expressed in equation 7.

A measuring device according to embodiments, by measuring a skew on two optical paths through signal delays of sufficient sizes for skew measurement on the optical paths, even a skew having a minute size can be measured within a measureable range.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A measuring device comprising:
a light source generating an optical signal;
an optical modulator modulating the optical signal;
an optical splitter splitting the modulated signal into first and second optical signals;
a first path into which a first optical line for transmitting the split first optical signal is inserted;
a second path into which a second optical line for transmitting the split second signal is inserted;
a balanced optical receiver receiving optical signals transmitted through the first and second paths; and
an analyzer measuring a skew between the first optical line and the second optical line on the basis of a first signal combined through the first path into which the first optical line is inserted and the second path into which the second optical line is inserted, and a second signal combined through the first path into which the second optical line is inserted and the second path into which the first optical line is inserted.

2. The measuring device of claim 1, wherein the analyzer measures the skew by dividing a result of a sum or subtraction operation of the first and second signals in half.

3. The measuring device of claim 2, wherein the analyzer measures the skew by using an equation;

$$\Delta T = |\Delta_{12}| = \frac{1}{2}(\Delta T' + \Delta T'') \text{ or } \frac{1}{2}|\Delta T' - \Delta T''|$$

$$\Delta T' = |T1 + T3 - T2 - T4|, \text{ and}$$

$$\Delta T'' = |T1 + T4 - T2 - T3|,$$

where, is T1-T2, T1 denotes a time taken for transmission of an optical signal passing through the first optical line, T2 denotes a time taken for transmission of an optical signal passing through the second optical line, T3 denotes a time taken for transmission of an optical signal passing through the first path, and T4 denotes a time taken for transmission of an optical signal passing through the second path.

4. The measuring device of claim 3, wherein $\Delta T'$ and $\Delta T''$ are calculated as $$\Delta T' = \begin{cases} \Delta_{12} + \Delta_{34}, & \text{if } \Delta_{12} > -\Delta_{34} \\ -\Delta_{12} - \Delta_{34}, & \text{if } \Delta_{12} \leq -\Delta_{34} \end{cases} \text{ and}$$

$$\Delta T'' = \begin{cases} \Delta_{12} - \Delta_{34}, & \text{if } \Delta_{12} > \Delta_{34} \\ -\Delta_{12} + \Delta_{34}, & \text{if } \Delta_{12} \leq \Delta_{34} \end{cases},$$

and $\Delta_{34}$ is T3-T4.

5. The measuring device of claim 2, further comprising a delay element having a preset or adjustable time delay on one path of the first and second paths.

6. The measuring device of claim 2, wherein at least one of the optical splitter and the balanced optical receiver provides a preset or adjustable time delay on one path of the first and second paths.

7. The measuring device of claim 2, wherein one path of the first and second paths has a length to provide a preset skew value or greater.

8. The measuring device of claim 1, further comprising a switch unit which controls the first optical line to be located on the first path, and the second optical line to be located on the second path at a first time, and controls the second optical line to be located on the first path, and the first optical line to be located on the second path.

9. The measuring device of claim 8, wherein the switch unit comprises:
a first switch connected to the optical splitter, and controlling positions of the first and second lines located on the first and second paths to be exchanged at the first and second times; and
a second switch connected to the balanced optical receiver, and controlling positions of the first and second optical lines on the first and second paths to be exchanged at the first and second times.

10. The measuring device of claim 1, wherein the analyzer controls an optical signal modulation operation through the optical modulator.

* * * * *